(12) United States Patent
Gruber

(10) Patent No.: US 8,821,090 B2
(45) Date of Patent: Sep. 2, 2014

(54) DOWEL COMPOSED OF A STRAND ARRANGEMENT

(75) Inventor: Bruno Gruber, Olching (DE)

(73) Assignee: MHT Patentverwertungs-, Beteiligungs-und Verwaltungs GmbH, Martinsried (DE)

(*) Notice: Subject to any disclaimer, the term of this patent is extended or adjusted under 35 U.S.C. 154(b) by 1011 days.

(21) Appl. No.: 12/373,399

(22) PCT Filed: Jul. 9, 2007

(86) PCT No.: PCT/DE2007/001213
§ 371 (c)(1),
(2), (4) Date: Jan. 12, 2009

(87) PCT Pub. No.: WO2008/006345
PCT Pub. Date: Jan. 17, 2008

(65) Prior Publication Data
US 2009/0279980 A1 Nov. 12, 2009

(30) Foreign Application Priority Data
Jul. 12, 2006 (DE) .......................... 10 2006 032 156

(51) Int. Cl.
*F16B 13/04* (2006.01)

(52) U.S. Cl.
CPC .................................. *F16B 13/04* (2013.01)
USPC ........................................... 411/22; 411/80.5

(58) Field of Classification Search
USPC ....................... 411/55, 80.1, 80.5, 82, 22, 517
See application file for complete search history.

(56) References Cited

U.S. PATENT DOCUMENTS

| 2,308,825 A * | 1/1943 | Rawlings ............................. 87/1 |
| 4,620,406 A | 11/1986 | Huegel et al. |
| 4,787,186 A | 11/1988 | Irmscher et al. |

(Continued)

FOREIGN PATENT DOCUMENTS

| DE | 2615316 | 10/1977 |
| FR | 1023043 | 3/1953 |
| GB | 11017 | 0/1898 |
| GB | 11017 A | 0/1898 |

*Primary Examiner* — Roberta Delisle
(74) *Attorney, Agent, or Firm* — Rothwell, Figg, Ernst & Manbeck, P.C.

(57) ABSTRACT

The invention relates to a dowel that is composed of a strand arrangement comprising at least one first strand (12) which extends along a longitudinal axis (L) and at least one second strand (14) which extends at an angle (Y) to the at least one first strand (12) and intersects said at least one first strand (12) at intersection points. The at least one first strand (12) and/or the at least one second strand (14) is/are wound around the longitudinal axis (L) at a certain distance (171, 172) while the at least one first strand (12) is connected to the at least one second strand (14) at the intersection points. The strand arrangement is embodied such and/or is made of such a material that the strand arrangement can be expanded at an angle to the longitudinal axis (L). Such a dowel has the particular advantage of evenly distributing the pressure which acts upon the wall surface (102) of a bore. A single-size dowel can be used for several screw diameters. Furthermore, the amount of boring dust produced is significantly reduced, less power is required for drilling the bore, and the feed force applied to the drill can be decreased because a bore with a comparatively small diameter can be created.

32 Claims, 4 Drawing Sheets

(56) References Cited

U.S. PATENT DOCUMENTS

| | | | |
|---|---|---|---|
| 4,968,185 A * | 11/1990 | Leibhard et al. | 405/259.5 |
| 5,104,266 A * | 4/1992 | Daryoush et al. | 405/259.5 |
| 5,456,062 A | 10/1995 | Wechsler | |
| 5,553,436 A * | 9/1996 | Kish et al. | 52/704 |
| 5,632,839 A * | 5/1997 | Kish et al. | 156/194 |
| 5,669,199 A * | 9/1997 | Ludwig et al. | 52/704 |
| 5,711,132 A * | 1/1998 | Kish et al. | 52/704 |
| 6,837,018 B1 * | 1/2005 | Hagel et al. | 52/698 |

\* cited by examiner

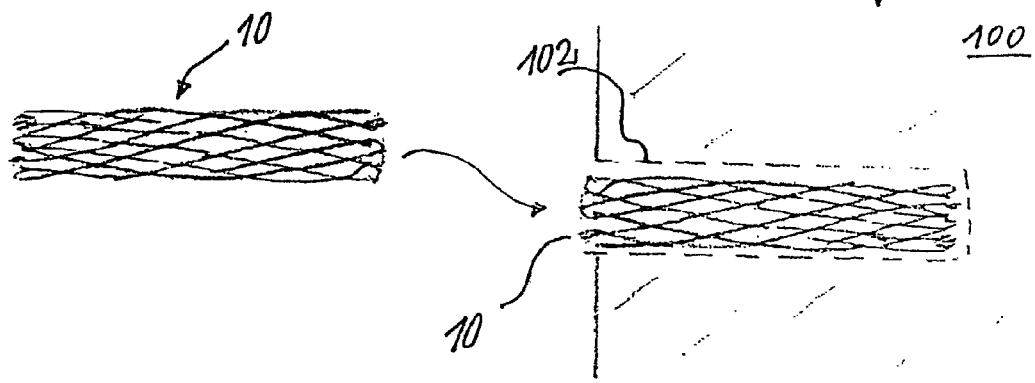
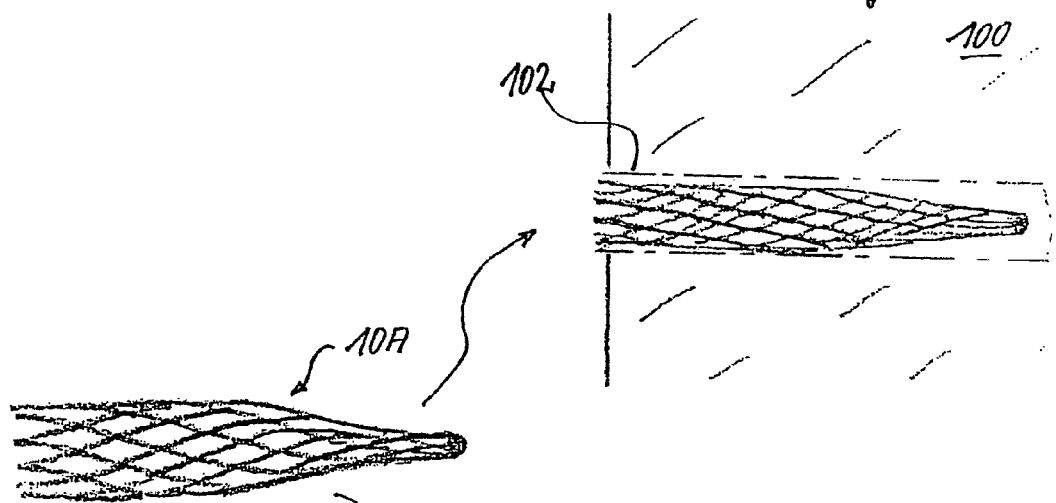
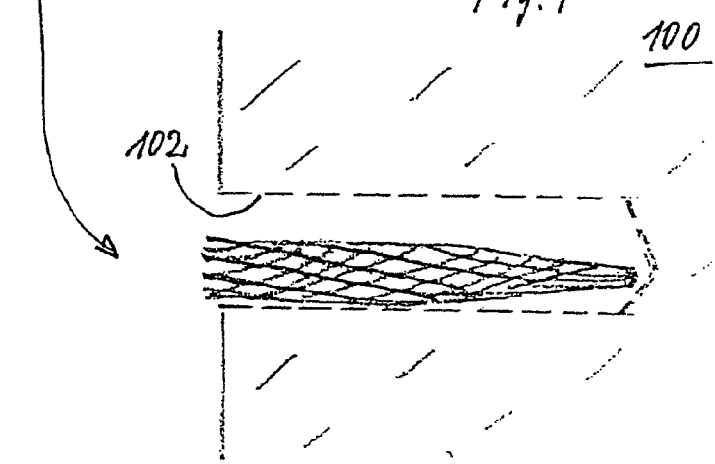

DOWEL COMPOSED OF A STRAND ARRANGEMENT

CROSS REFERENCE TO RELATED APPLICATION

This application is a 35 U.S.C. 371 National Phase Entry Application from PCT/DE2007/001213, filed Jul. 9, 2007, which claims the benefit of German Patent Application No. 10 2006 032 156.1 filed on Jul. 12, 2006, the disclosure of which is incorporated herein in its entirety by reference.

The present invention relates to a dowel as claimed in claim 1.

Conventionally known dowels have the drawback that the diameter of a drill hole into which the dowel is to be inserted must be somewhat larger than the screw diameter. Therefore, the drilling power to be applied for attaining the drill hole and the amount of drilling dust which is produced during drilling are comparatively high. Furthermore, a corresponding dowel is provided for each screw diameter, so that a broad range of dowels must be kept in stock.

The invention is based on the object of providing a dowel which has a simple construction and can be used in a broad range of applications.

This object is achieved by the features specified in claim 1.

A dowel according to the invention is composed of a strand arrangement comprising at least one first strand which extends along a longitudinal axis, and at least one second strand which extends at an angle to the at least one first strand and intersects the at least one first strand at intersection points. The at least one first strand and/or the at least one second strand is/are wound around the longitudinal axis at a distance and the at least one first strand is connected to the at least one second strand at the intersection points. The strand arrangement is embodied in such a way and/or is made of such a material that said strand arrangement can be expanded at an angle to the longitudinal axis. A particular advantage of a dowel of this type consists in the fact that the contact pressure acting on the wall surface of a drill hole is distributed uniformly.

The single-size dowel can be used for a plurality of screw diameters. As a drill hole can be embodied with a comparatively small diameter, the amount of drilling dust is greatly reduced, less power is required for drilling the drill hole and the feed force applied to the drill can be reduced.

Developments of the invention are specified in the subclaims.

The invention will be described in greater detail with reference to the drawings, in which:

FIG. 5 is a sectional view of a wall with a drill hole and with a dowel inserted into said drill hole according to the first embodiment;

FIG. 6 is a sectional view of a wall with a drill hole and with a dowel inserted into said drill hole according to the second embodiment;

FIG. 7 is a sectional view similar to FIG. 6, wherein the drill hole is larger than the unstretched diameter of the dowel;

Figure 1:
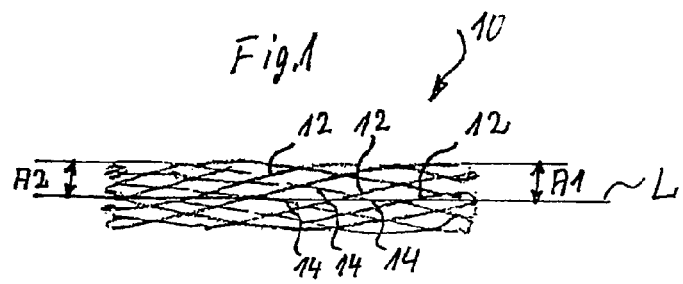
FIG. 1 is a view of a dowel according to the invention in a first embodiment of the invention.
Figure 1A:
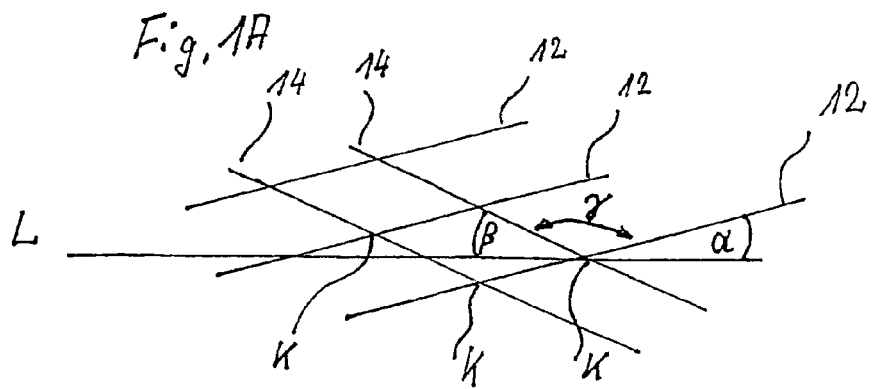
FIG. 1A is an enlarged illustration of the view of FIG. 1.

As is shown in FIGS. 1 and 1A, a dowel 10 according to a first embodiment is composed of a strand arrangement which is formed from a large number of first strands 12 which run parallel to one another, are set apart from a longitudinal axis L at a radial distance A1 and are wound around the longitudinal axis L so as to be provided with a pitch angle $\alpha$, and which is formed from a large number of second strands 14 which run parallel to one another, are set apart from the longitudinal axis L at a radial distance A2 and are wound around the longitudinal axis L so as to be provided with a pitch angle $\beta$.

The pitch angle $\alpha$ and the pitch angle $\beta$ have the same amount, but run in an opposite direction, thus producing intersection points K between the first strands 12 and the second strands 14. At the intersection points K, the first strands 12 are connected to the second strands 14 and have an angle $\gamma$ relative to one another. As the second strands 14 rest on the surface, which is on the outside in the radial direction, of the first strands 12, the radial distance A2 of the second strands 14 from the longitudinal axis L and the material thickness of the first strands 12 is greater than the radial distance A1 of the first strands 12 from the longitudinal axis L. In the embodiment shown, the dowel 10 is embodied in the form of a sleeve which is open at both ends and has a grid-like or net-like structure.

Figure 2:
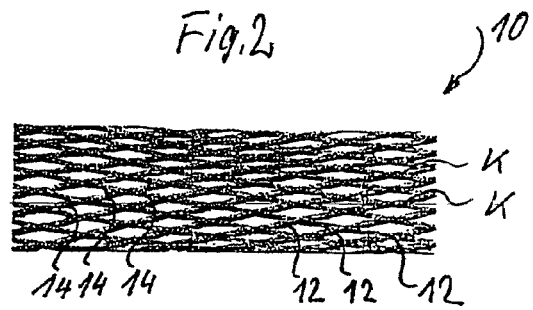
FIG. 2 is a plan view of a configuration of the dowel along its longitudinal axis in an unstretched state.
Figure 3:
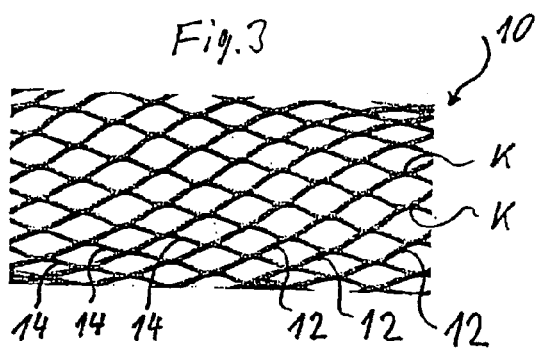
FIG. 3 is a plan view onto a configuration of the dowel along its longitudinal axis in a stretched state.

In the embodiment shown, the first strands 12 and the second strands 14 have a circular cross section having a diameter of 1 mm, wherein the pitch angles $\alpha$ and $\beta$ assume, when the dowel is unstretched (see FIGS. 1 and 2), an acute angle, which is less than 45°, to the longitudinal axis L. Also obtained as intermediate spaces between the first strands 12 and the second strands 14 are rhombuses which have, when the dowel 10 is unstretched (FIG. 2), a length of 4 mm and a width of 2 mm. When the dowel 10 is stretched (FIG. 3), the rhombuses have a length of 4 mm and a width of 4 mm. The angle $\gamma$ has in the preferred embodiment an obtuse angle, so that there is a good capacity for expansion of the strand arrangement transversely to the longitudinal axis L.

The first strands 12 and the second strands 14 are made in the preferred embodiment of plastics material, for example of polypropylene, polyethylene, nylon, soft PVC or another soft plastics material. The material can also differ from the aforementioned materials, wherein it is important that the strand arrangement forming the dowel 10 can be expanded at an angle to the longitudinal axis L (in a preferred manner at an angle of 90°).

The material used for the first strands 12 and the second strands 14 is colored or transparent.

Modifications of the dowel 10 from the embodiment shown are possible.

In a modified embodiment, only a first strand 12 is wound around the longitudinal axis L at a distance A1 and has a pitch angle $\alpha$, and a second strand 14 or a large number of second strands 14 extend(s) parallel to the longitudinal axis L and is/are set apart therefrom.

In a further modification, a large number of first strands 12 extend at a right angle to the longitudinal axis L and a large number of second strands 14 extend parallel to the longitudinal axis L.

In another modification, the pitch angles α and β assume an acute angle, which is equal to or greater than 45°, relative to the longitudinal axis L when the dowel 10 is unstretched. In a further modification, the pitch angles α and β are of unequal size.

In another modification, the first strands 12 and the second strands 14 lie in one plane, so that the radial distance A1 of the first strands 12 from the longitudinal axis L and the radial distance A2 of the second strands 14 from the longitudinal axis L have the same amount.

Although in the embodiment shown the radial distance A1 of the first strands 12 and the radial distance A2 of the second strands 14 are constant over the entire length of the dowel 10, the distance A1 and the distance A2 can decrease continuously in a partial region of the length of the dowel 10 or over an entire region of the length of the dowel 10, thus producing a conical shape of the dowel 10. In a modified embodiment, the distances A1 and A2 decrease in a discontinuous manner.

Instead of a round cross section, the first strands 12 and the second strands 14 have in modified embodiments a square, rectangular or oval cross section or another cross-sectional shape. In a further modification, the first strands 12 have a different cross-sectional shape to that of the second strands 14.

Figure 4:
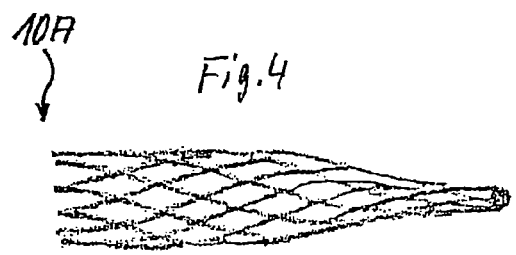
FIG. 4 is a view of a dowel according to the invention in a second embodiment of the invention.

In another embodiment of a strand 10A shown in FIG. 4, the first strands 12 are connected to the second strands 14 at one end of the strand arrangement. In the preferred embodiment, the first strands 12 are welded to the second strands 14 at one end of the strand arrangement. In one embodiment, this gives rise to the state in which the distance A1 and the distance A2 decrease continuously at least over a region of the length of the dowel 10A.

FIG. 5 shows how the dowel 10 is inserted in a drill hole 102 in a wall 100, the drill hole 102 having roughly the same diameter as the dowel 10.

FIG. 6 shows how the dowel 10A is inserted in a drill hole 102 in a wall 100, the drill hole 102 having roughly the same diameter as the dowel 10A.

FIG. 7 shows how the dowel 10A is inserted in a drill hole 102 in a wall 100, the drill hole 102 having a very much larger diameter than the dowel 10A (moreover, this is also possible in the case of a dowel 10). As a result of the particular structure of the strand arrangement, the dowel 10 and the dowel 10A can be expanded at an angle to the longitudinal L by inserting a fastening element.

Figure 8:
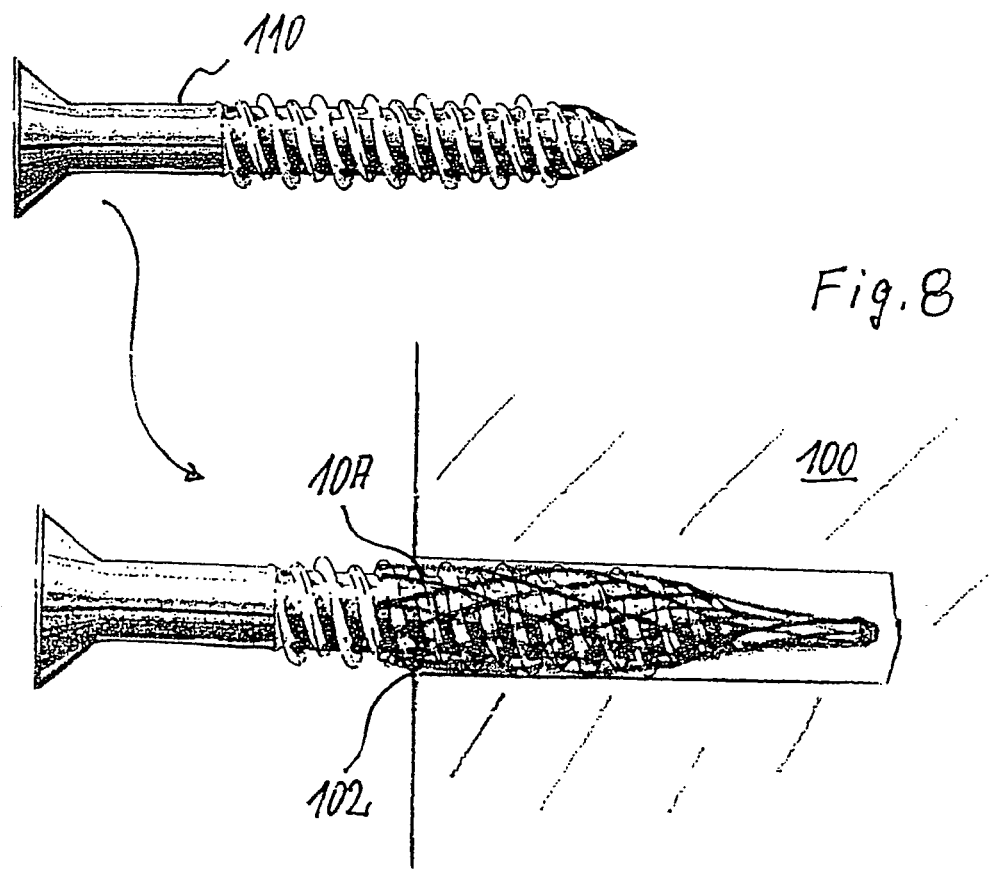
FIG. 8 is a sectional view of a wall with a drill hole and inserted dowel which receives a wood screw.
Figure 9:
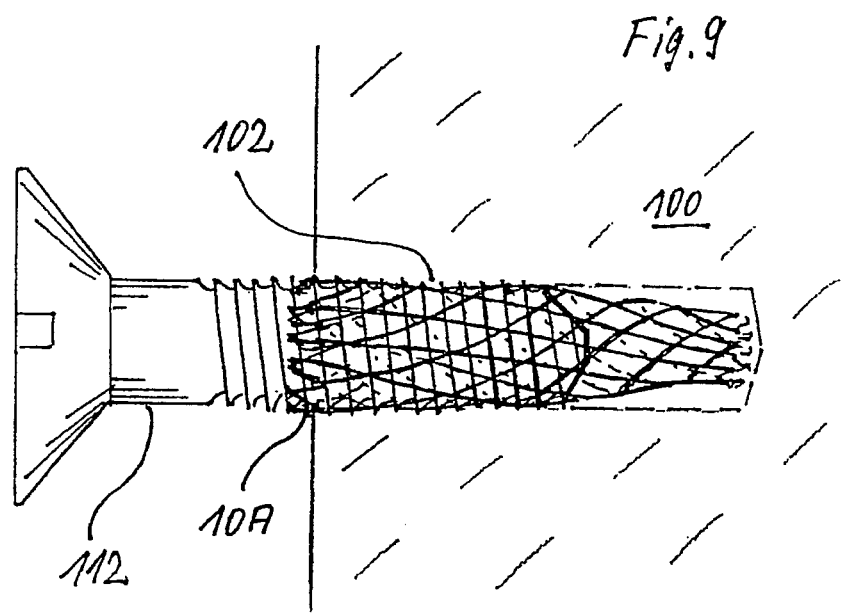
FIG. 9 is a sectional view of a wall with a drill hole and inserted dowel which receives a nail screw.
Figure 10:
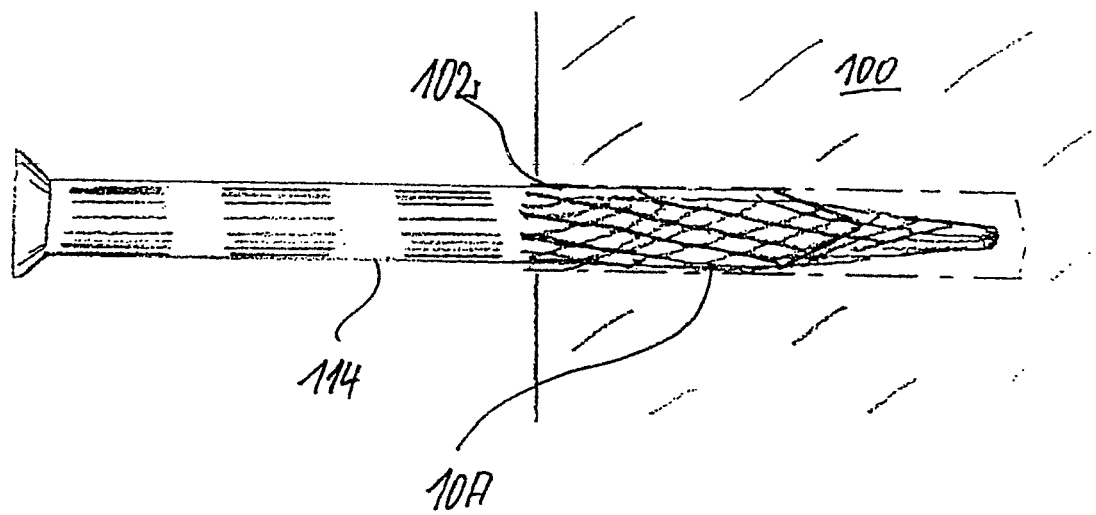
FIG. 10 is a sectional view of a wall with a drill hole and inserted dowel which receives a steel nail.
Figure 11:
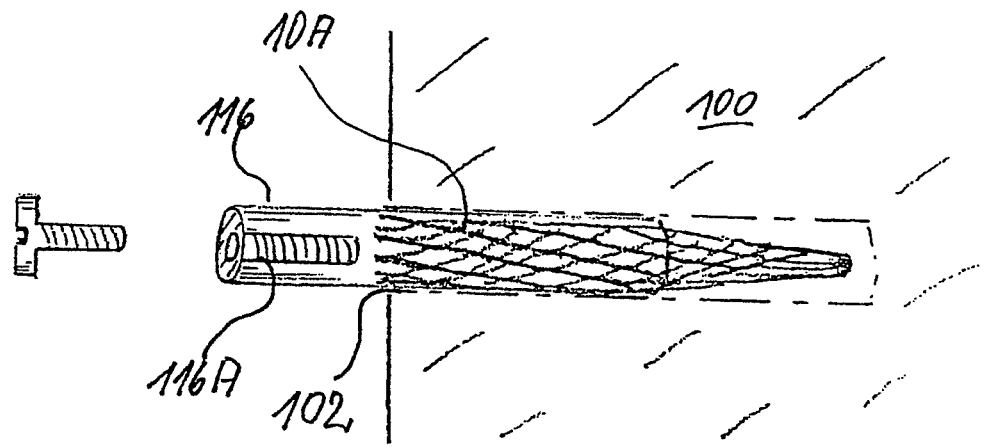
FIG. 11 is a sectional view of a wall with a drill hole and inserted dowel which receives a bolt provided with an internal thread.

The fastening element can be a wood screw 110 (see FIG. 8), a nail screw 112 (see FIG. 9), a steel nail 114 (see FIG. 10), a bolt 116 having an internal thread 116A for receiving a screw 118 (see FIG. 11) or a metric screw.

During screwing-in of a screw, such as for example the wood screw 110 or a metal threaded screw (not shown), the strand arrangement is pressed into the threaded notches of the screw, excess material being pressed against the wall surface of the drill hole 102.

During driving-in of steel nails, such as for example the steel nail 114, the strand arrangement digs into the rough wall surface of the drill hole 102, so that the dowel 10; 10A does not slip into the drill hole 102.

The dowel 10; 10A is inserted into the drill hole 102 before the fastening element is screwed in or driven in. In the case of smooth drill holes, the dowel 10; 10A can also be grazed via the fastening element and then be driven into the drill hole 102. The dowel diameter is in this case adapted to the diameter of the fastening element.

In a modified application, the dowel 10; 10A is dipped into a liquid filling compound or adhesive before being inserted into the drill hole 102.

In the case of the dowel 10; 10A according to the invention, the diameter of the drill hole 102 can be the same size as or only slightly larger than the diameter of the fastening element. In the case of porous or rough surfaces of the drill hole 102, the diameter of the drill hole 102 can correspond to the diameter of the fastening element. In the case of a smooth surface of the drill hole 102, the diameter of the drill hole 102 is, for example if use is made of a steel nail 114 having a diameter of 4.3 mm, 5 mm.

A particular advantage of the dowel 10; 10A consists in the fact that the contact pressure acting on the wall surface of the drill hole 102 is distributed uniformly. The same dowel size can be used for a number of diameter sizes of the drill hole 102, for example for a 3 mm, 4 mm, 5 mm and 10 mm drill hole 102.

As the drill hole 102 can be embodied so as to have a comparatively small diameter and be just as large as or slightly larger than the diameter of the dowel 10; 10A, the amount of drilling dust is greatly reduced, less power is required for drilling the drill hole 102 and the feed force applied to the drill can be reduced.

The strand arrangement used for use of a dowel 10 can be an extruded, flexible grid pipe, which is intended for protecting a cable, or a net-like tube, the diameter of which corresponds to the dowel diameter and is cut to length. The dowel 10A is manufactured in such a way that the strands of the flexible grid pipe are drawn together at one end and welded.

Mixed forms between the described embodiments and the modifications thereof form part of the scope of protection of the present invention.

The invention claimed is:

1. A dowel for receiving a fastening element comprising:
a strand arrangement having a stretched and unstretched configuration, wherein in said unstretched configuration at least one first strand extends along a longitudinal axis, and at least one second strand extends at an angle (γ) to the at least one first strand and intersects the at least one first strand at intersection points, and
the strand arrangement is adapted to expand to the stretched configuration upon receipt of the fastening element such that said angle (γ) between said first and second strands when in the stretched configuration is less than said angle in the unstretched configuration,
wherein the at least one first strand and/or the at least one second strand is/are wound around the longitudinal axis at a distance and the at least one first strand is connected to the at least one second strand at the intersection points.

2. The dowel of claim 1, wherein the strand arrangement includes a first plurality of strands.

3. The dowel of claim 2, wherein the strand arrangement includes a second plurality of strands.

4. The dowel of claim 3, wherein the first plurality of strands extend at a right angle to the longitudinal axis, and the second plurality of strands extend parallel to the longitudinal axis and set apart therefrom.

5. The dowel of claim 3, wherein the first plurality of strands run parallel to one another, are set apart from the longitudinal axis at a first radial distance (A1) and are wound around the longitudinal axis so as to be provided with a first pitch angle (α), and the second plurality of strands run parallel to one another, are set apart from the longitudinal axis at a second radial distance (A2) and are wound around the longitudinal axis so as to be provided with a second pitch angle (β).

6. The dowel of claim 5, wherein the first plurality of strands extend in opposition to a direction of the second plurality of strands, so that the pitch angle (α) of the first plurality of strands extends in opposition to the pitch angle (β) of the second plurality of strands.

7. The dowel of claim 6, wherein the pitch angle (α) of the first plurality of strands and the pitch angle (β) of the second plurality of strands have the same amount.

8. The dowel of claim 6, wherein the pitch angle (α) of the first plurality of strands and the pitch angle (β) of the second plurality of strands have a different amount.

9. The dowel of claim 6, wherein the pitch angle (α) of the first strands and/or the pitch angle (β) of the second strands is or are embodied as an acute angle which is less than 45°.

10. The dowel of claim 6, wherein the pitch angle (α) of the first strands and/or the pitch angle (β) of the second strands is or are embodied as an acute angle which is greater than 45°. or equal to 45°.

11. The dowel of claim 1, wherein the first strand is wound around the longitudinal axis at a distance, and the second strand extends parallel to the longitudinal axis.

12. The dowel of claim 1, wherein the angle (γ) between the at least one first strand and the at least one second strand is an obtuse angle in said unstretched configuration.

13. The dowel of claim 1, wherein the at least one second strand rests on the surface, which is on the outside in the radial direction, of the at least one first strand, so that the distance (A1) of the first strand from the longitudinal axis and the distance (A2) of the second strand from the longitudinal axis differ in size.

14. The dowel of claim 1, wherein the at least one first strand and the at least one second strand lie in one plane, so that the radial distance (A1) of the at least one first strand from the longitudinal axis and the radial distance (A2) of the at least one second strand from the longitudinal axis have the same amount.

15. The dowel of claim 1, wherein the at least one first strand and/or the at least one second strand have a circular cross section.

16. The dowel of claim 1, wherein the at least one first strand and/or the at least one second strand have a rectangular, square or oval cross section.

17. The dowel of claim 1, wherein the at least one first strand and the at least one second strand have a differing cross-sectional shape.

18. The dowel of claim 1, wherein the strand arrangement is configured to be open at both ends.

19. The dowel of claim 1, wherein the strand arrangement is configured to be closed at one end.

20. The dowel of claim 1, wherein the radial distance (A1) of the at least one first strand and the radial distance (A2) of the at least one second strand is the same size over the entire length of the dowel.

21. The dowel of claim 1, wherein the radial distance (A1) of the at least one first strand and the radial distance (A2) of the at least one second strand decreases continuously at least over a partial region of the length of the dowel.

22. The dowel of claim 1, wherein the strand arrangement is embodied in such a way that it can be expanded at an angle of 90° to the longitudinal axis.

23. The dowel of claim 1, wherein the dowel is made of plastics material.

24. The dowel of claim 23, wherein the plastics material is a colored plastics material.

25. The dowel of claim 23, wherein the plastics material is a transparent plastics material.

26. The dowel of claim 23, wherein the plastics material comprises polypropylene, polyethylene, nylon, soft PVC or another soft plastics material.

27. The dowel of claim 1, wherein the dowel is made from an extruded, flexible grid pipe, which is intended for protecting a cable, or a net-like tube.

28. A method for manufacturing a dowel, comprising the steps of:
strand-casting a tubular strand arrangement as claimed in claim 1, and cutting the strand arrangement to length to form a strand piece which forms the dowel.

29. The method of claim 28, further comprising welding an end of the strands to form the dowel.

30. The method of claim 28, further comprising dipping the dowel into a liquid filling compound or adhesive.

31. A use of an extruded, flexible grid pipe, which is intended for protecting a cable, or an extruded, net-like tube for use of a dowel as claimed in claim 1.

32. A method of inserting a fastening element into a drill hole, comprising the steps of:
inserting a dowel into a drill hole, wherein said dowel is formed of an extruded, flexible grid pipe or an extruded, net-like tube;
expanding the dowel at an angle to a longitudinal axis of said dowel to press the dowel against a surface of the drill hole by inserting the fastening element into said dowel.

* * * * *